Jan. 6, 1970 A. E. VASSILIADES 3,488,207
PROCESS OF PREPARING A COLORED SUBSTANCE AND TRANSFER COPY SET
Filed Oct. 22, 1965

INVENTOR
ANTHONY E. VASSILIADES
BY Beale and Jones
ATTORNEYS

2

United States Patent Office 3,488,207
Patented Jan. 6, 1970

3,488,207
PROCESS OF PREPARING A COLORED SUBSTANCE AND TRANSFER COPY SET
Anthony E. Vassiliades, Staten Island, N.Y., assignor to U.S. Plywood-Champion Papers, Inc., a corporation of New York
Filed Oct. 22, 1965, Ser. No. 501,198
Int. Cl. B41c 1/06
U.S. Cl. 117—36.2                    9 Claims

ABSTRACT OF THE DISCLOSURE

There is disclosed a process for preparing a colored substance by contacting a color-reactant derivative of bis(p-dialkylaminoaryl) methane with a carboxylic acid which is either an aromatic acid containing a hydroxy group ortho to the carboxylic group or a nitro group meta to the carboxylic group or an aliphatic acid containing a hydroxy group on the carbon atom adjacent to the carboxylic group. The use of such a combination in a pressure responsive transfer copy system in which the transfer sheet contains the color-reactant material and the adsorbent sheet contains the acid is also disclosed.

---

Figure 1:
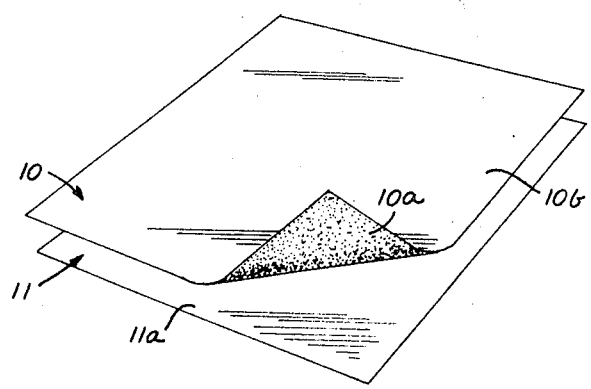

This invention relates to a process for the production of colored markings from derivatives of bis(p-dialkylaminoaryl) methane in which a nitrogen atom in a heterocyclic group is linked directly to the methane carbon atom, which markings form rapidly and are intense and stable even under conditions of prolonged exposure to heat, light and conditions of high relative humidity. This invention also relates to a pressure sensitive copy system which utilizes such a process for producing colored markings.

It is known in the art that certain materials, such as derivatives of bis(p-dialkylaminoaryl) methane of the type disclosed in U.S. Patents Nos. 2,981,733 and 2,981,738, turn from colorless to a deep blue or violet shade when brought into contact with an inorganic acidic electron acceptor such as kaolin, bentonite, attapulgite and magnesium trisilicate or with an organic acid such as tannic acid and benzoic acid. The ability of these compounds to form colored markings when brought into contact with an acidic material renders them useful in copy systems. In such a system, the bis(p-dialkylaminoaryl) methane derivative is incorporated in minute oil droplets which are coated by means of a film forming binder into a continous film on one surface of a transfer sheet. The film is such that under the pressure of writing or typing, the coating ruptures and the oil droplets in the area of the pressure are released and adsorbed on an underlying adsorbent sheet. The adsorbent sheet is provided with a coating of an inorganic or an organic acidic material. When the oil droplets from the transfer sheet come into contact with the adsorbent sheet, the bis(p-dialkylaminoaryl) methane derivative reacts with the acidic material to form a colored marking on the adsorbent sheet in the same pattern as the applied pressure.

However, the colored markings produced by the reaction of derivatives of bis(p-dialkylaminoaryl) methane and an inorganic acidic electron acceptor lack stability when exposed to heat and light for a prolonged period of time. Moreover, when such derivatives are brought into contact with common organic acids, such as tannic acid, benzoic acid, or aconitic acid, the color reaction is very slow, the resultant markings are of low intensity and the markings almost completely disappear in a short time when exposed to light and heat.

It is an object of this invention to provide a process for the production of colored markings from derivatives of bis(p-dialkylaminoaryl) methane in which a nitrogen atom in a heterocyclic group is linked directly to the methane carbon atom, which markings form rapidly and are intense and stable even under conditions of prolonged exposure to heat and light and conditions of high humidity.

It is a further object of this invention to provide a particular class of organic acids which, when contacted with derivatives of bis(p-dialkylaminoaryl) methane in which a nitrogen atom in a heterocyclic group is linked directly to the methane carbon atom, results in an intense colored marking which forms rapidly and which is stable under extreme conditions.

It is another object of this invention to provide a pressure sensitive copy system which utilizes such a process for producing colored markings.

These and other objects are accomplished by the practice of this invention which, briefly, comprises converting a color-reactant compound having the general formula

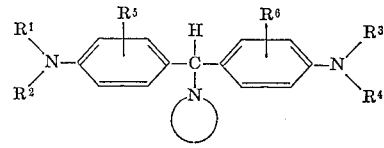

wherein:
Each $R^1$, $R^2$, $R^3$ and $R^4$ is a (lower)alkyl radical;
Each $R^5$ and $R^6$ is a member selected from the group consisting of hydrogen, (lower)alkyl, (lower)alkoxy, fluorine, chlorine, bromine, di(lower)alkylamino, (lower) alkanoylamino and —$SO_2NH_2$;

represents a radical selected from the group consisting of heterocyclic radicals containing at least one double bond and saturated heterocyclic radicals which:

When said radical contains at least one double bond, is a member containing 5 or 6 ring members and 1 to 3 nitrogen atoms, the remaining ring atoms being carbon, said radical being selected from the group consisting of those which are free from substituents and those which contain 1 to 2 substituents selected from the group consisting of alkyl up to 18 carbon atoms, octadecenyl, cycloalkyl in which the ring contains 5 to 6 carbon atoms, (lower)alkyloxy, (lower)hydroxyalkyl, (lower)hydroxyalkoxy, phenyl(lower)alkyl, mononuclear hydrocarbon aryl, mononuclear hydrocarbon aroxy, benzo, fluorine, chlorine, bromine, nitro, di(lower)alkylamino, (lower) alkanoylamino and —$SO_2NH_2$; and When said radical is saturated, is selected from the group consisting of pyrrolidino, piperidino, morpholino, thiomorpholino, hexamethylene imino, methylhexamethylene imino, heptamethylene imino, and piperazino, at least one of the piperazino nitrogen atoms forming the linking point to the methane carbon atom of a bis(p-dialkylaminoaryl) methane having the herein defined formula

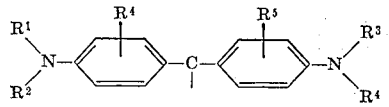

and substituted derivatives of pyrrolidino, piperidino, morpholino and piperazino in which the substituents are selected from the group consisting of alkyl up to 18 carbon atoms, octadecenyl, cycloalkyl and condensed cycloalkyl in which the rings contain 5 to 6 carbon atoms, (lower)alkyloxy, (lower)hydroxyalkyl, (lower)hydroxyalkoxy, phenyl(lower)alkyl, mononuclear hydrocarbon aryl, mononuclear hydrocarbon aroxy, fluorine, chlorine, bromine, nitro, di(lower)alkylamino, (lower)alkanoylamino, and —$SO_2NH_2$;

Into a colored substance by contacting said compound with a carboxylic acid selected from the group consisting of (a) aromatic acids containing a carboxylic group substituted on one of the carbon atoms of the aromatic ring and either a hydroxy group substituted on one of the carbon atoms of the aromatic nucleus ortho to the carboxylic group or a nitro group substituted on one of the carbon atoms of the aromatic nucleus meta to the carboxylic group and (b) aliphatic acids containing a hydroxy group substituted on the carbon atom which is adjacent to the carboxylic group. The color reaction is almost instantaneous and the resultant color is stable towards the effects of direct sunlight, infra red and ultra violet radiations, heat and high relative humidity.

The derivatives of bis(p-dialkylaminoaryl) methane which may be used in the practice of this invention are disclosed and described in U.S. Patent No. 2,981,733 and U.S. Patent No. 2,981,738, the disclosures of which are incorporated herein by reference. Examples of such compounds include the following:

1-[bis(p-dimethylaminophenyl)methyl]-pyrrolidine
1-[bis(p-dimethylaminophenyl)methyl]-piperidine
1-[bis(p-diethylaminophenyl)methyl]-piperidine
4-[bis(p-dimethylaminophenyl)methyl]-morpholine
4-[bis(p-diethylaminophenyl)methyl]-morpholine
1-[bis(p-dimethylaminophenyl)methyl]-piperazine
1-[bis(p-dimethylaminophenyl)methyl]-4-methylpiperazine
1-[bis(p-dimethylaminophenyl)methyl]-4-hydroxyethylpiperazine
1,4-bis[bis(p-dimethylaminophenyl)methyl]-piperazine
1,4-bis[bis(p-diethylaminophenyl)methyl]-piperazine
1-[bis(p-dimethylaminophenyl)methyl]-benzotriazole
1-[bis(p-dimethylaminophenyl)methyl]-3,5-dimethylpyrazole
1-[bis(p-dimethylaminophenyl)methyl]-benzimidazole
N-[bis(p-dimethylaminophenyl)methyl]indole
N-[bis-(p-dimethylaminophenyl)methyl]-pyrrole
1-[bis(p-dimethylaminophenyl)methyl]-2-methyl-2-imidazoline
N-[bis(p-dimethylaminophenyl)methyl]-carbazole As used herein, the term "lower," when used to describe a substituent, e.g., "(lower)alkyl" and "(lower)alkoxy," is intended to include straight and branched chain groups containing up to six carbon atoms.

The carboxylic acids per se which maybe used in the practice of this invention are also known in the art. Such acids include 3-hydroxy-2-naphthoic acid, 1-hydroxy-2-naphthoic acid, 3-nitrophthalic acid, m-cresotic acid, o-cresotic acid, p-cresotic acid, salicylic acid, 3-nitrosalicylic acid, m-nitrobenzoic acid, glycolic acid, lactic acid, α-hydroxybutyric acid, α-hydroxydecanoic acid, malic acid, citric acid, tartaric acid, etc.

The color-reactant bis(p-dialkylaminoaryl) methane derivative may be contacted with the carboxylic acid in accordance with the practice of this invention in a variety of embodiments. Thus, for example, the bis(p-dialkylaminoaryl) methane derivative may be dissolved in a solvent such as benzene or toluene, and the carboxylic acid added to the solution in an amount sufficient to cause coloration of the bis(p-dialkylaminoaryl) methane derivative. There is thus obtained a deep blue or violet dye solution. The color formation occurs almost instantaneously.

In the preferred embodiment of this invention, the bis (p-dialkylaminoaryl) methane derivative and the carboxylic acid are employed in a pressure responsive transfer copy system comprising a transfer sheet superimposed on an adsorbent sheet. In this embodiment, the color-reactant bis(p-dialkylaminoaryl)methane derivative is incorporated in a coating on the transfer sheet and the carboxylic acid is incorporated in a coating on the adsorbent sheet. The coating on the transfer sheet comprises a material which normally acts to insulate the color-reactant material from contact with the absorbent sheet but which is rupturable upon the application of localized pressure, such as writing or printing pressure, on the transfer sheet whereby the color-reactant material is released and transferred to the underlying adsorbent sheet. The bis(p-dialkylaminoaryl) methane derivative then reacts with the carboxylic acid contained in the coating on the adsorbent sheet resulting in the formation of a colored marking on the adsorbent sheet at the points where the pressure was applied to the overlying transfer sheet.

To prepare the transfer sheet, the bis(p-dialkylaminoaryl) derivative may be dissolved in an oil, such as cottonseed oil or soybean oil, and encapsulated in microcapsules, the walls of which are impermeable to the oil but which are easily ruptured by the application of localized pressure. These microcapsules, dispersed in a suitable binding material, are then coated onto one surface of a web material such as paper and the coated web material dried. Alternatively, an oil containing the bis(p-dialkylaminoaryl) derivative dissolved therein may be emulsified in a suitable liquid film-forming material, the resultant emulsion coated on the web material and the web material dried. A basic buffering agent may be added to the emulsion if necessary to maintain a pH of the system suitable to prevent a premature color reaction of the color-reactant material.

The film-forming, encapsulating and/or binding materials which may be used are materials which are well known in the art and include solutions of starch, gelatin, methyl cellulose, etc.

In the preparation of the adsorbent sheet, the carboxylic acid may be dissolved in a suitable solvent therefor and the resultant solution coated onto one surface of a web material such as paper, Alternatively, the carboxylic acid may be dissolved in an oil medium and emulsified with water by means of an amphiphilic surface active agent, or combination of such agents, having a hydrophile-lipophile-balance similar to that of the oil used. When complete emulsification has occurred, the emulsion is coated onto one surface of a web material and dried at a suitable temperature. The dried surface of the paper contains either microcapsules containing minute droplets of oil having dissolved therein the carboxylic acid or a film having entrapped therein minute oil droplets having dissolved therein the carboxylic acid. The film or the walls of the capsules, consisting of the emulsifying agent, are impermeable to the oil but are easily ruptured by the application of printing or writing pressure resulting in the release of the oil. The oil is then instantaneously adsorbed on the surface of the web material thus exposing the carboxylic acid to the bis(p-dialkylaminoaryl) derivative released from an overlying transfer sheet coating.

In a different, preferred embodiment for the preparation of a pressure responsive transfer copy system adsorbent sheet, the carboxylic acid is adsorbed on an inorganic mineral pigment, such as titanium dioxide, zinc oxide, barium sulfate, calcium sulfate, etc., before it is incorporated into the coating of the adsorbent sheet. This may be accomplished by melting the carboxylic acid and mixing it with the inorganic mineral pigment while in the molten state; or by adsorbing the carboxylic acid onto the substrate from a solution.

When the carboxylic acid is adsorbent from a melt, the substrate should also be heated to approximately the same temperature as the molten acid prior to admixing to prevent crystallization of the acid. The mixture of the molten acid and the substrate is maintained at the temperature of the molten acid for approximately 10 to 15 minutes to obtain maximum adsorbtion of the acid on the particulate substrate. Subsequently, the substrate containing the adsorbed carboxylic acid is cooled and reduced to a fine powder by grinding. The fine powder is then dispersed in a solution of a binder and thereafter coated onto the surface of the web material.

In another embodiment of this invention for preparing the adsorbent sheet, the carboxylic acid is dissolved in a suitable solvent, such as water, acetone, ethanol, etc., and the resultant solution thickened by the addition of a thickening agent. The mixture is then coated on the surface of the web material and dried.

The web material which is used as the transfer sheet and the adsorbent sheet is preferably paper although other materials, such as plastic, fabric or textile webs may be also used. When paper is to be used as an intermediate sheet in a manifold pressure responsive transfer copy system and is to be coated on one side with the carboxylic acid and on the other side with the color-reactant material, it is preferred to precoat the paper with a material which will reduce the porosity of the paper. Such materials are conventional and include copolymers of butadiene and styrene, copolymers of styrene and acrylonitrile, polyvinyl alcohol, starch, etc.

Figure 2:
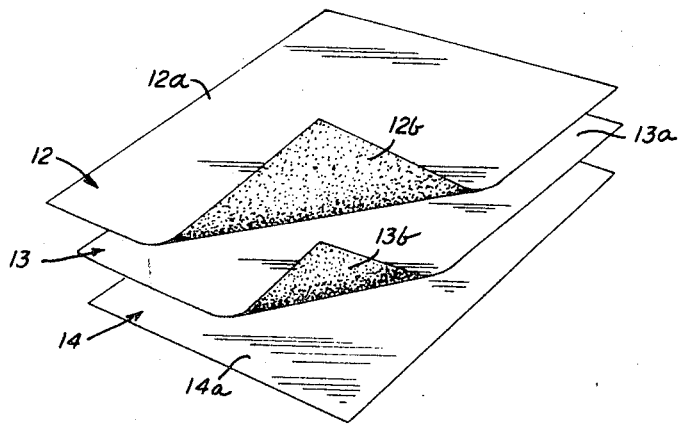

The aspects of this invention which are capable of illustration are shown in the accompanying drawings wherein:

FIGS. 1 and 2 show pressure responsive transfer copy systems of the type contemplated by this invention.

FIG. 1 shows a transfer sheet 10 and an adsorbent sheet 11 arranged one above the other so that the surface 10a of the transfer sheet, having a coating thereon containing the bis(p-dialkylaminoaryl) methane derivative dissolved in oil, is in contact with the surface 11a of the adsorbent sheet having a coating thereon containing the carboxylic acid. Thus, when printing or writing pressure is applied to the uncoated side 10b of the transfer sheet, the oil is released from the coating on the surface 10a of the transfer sheet and is transferred to the surface 11a of the adsorbent sheet. The bis(p-dialkylaminoaryl) methane derivative dissolved in the oil thereupon reacts with the carboxylic acid contained in the coating on the adsorbent sheet resulting in the formation of a colored marking on the surface 11a of the adsorbent sheet.

FIG. 2 shows a manifold system containing three sheets, 12, 13 and 14. The surface 12b of the top sheet 12 and the surface 13b of the intermediate sheet 13 have coatings containing the color-reactant materials dissolved in oil. The surface 13a of the intermediate sheet 13, which is in contact with the surface 12b of the overlying sheet, and the surface 14a of the sheet 14, which is in contact with the surface 13b of the intermediate sheet 13, have coatings containing the carboxylic acid. Thus, when printing or writing pressure is applied to the uncoated side 12a of the top sheet, the oil containing the color-reactant material is released from the coatings on the surfaces 12b and 13b and is transferred to and adsorbed on the surfaces 13a and 14a. The color-reactant material thereupon reacts with the carboxylic acid contained in the coatings on the surfaces 13a and 14a resulting in the formation of colored markings on those surfaces.

Due to the unique coaction between the particular type of carboxylic acids and the particular color reactant materials used in the practice of this invention, the colored markings form almost instantaneously and are remarkably stable towards exposure to direct sunlight, infra red and ultra violet radiations, heat and high relative humidity. Moreover, the colored markings are completely smudge proof and do not stain the skin when the record sheets are handled. Furthermore, transfer copy systems of the types shown in FIGS. 1 and 2 do not smudge during normal handling.

The following examples illustrate the best modes contemplated for carrying out this invention:

EXAMPLE 1

This example illustrates the preparation of a transfer sheet for use in a pressure responsive copy system. In chlorinated biphenyl oil (50 g.) there is dissolved 1-[bis (p-dimethylaminophenyl)methyl]-pyrrolidine (2 g.). To this solution, there is added a copolymer of methyl vinyl ether and maleic anhydride (8 g.) and purified pigskin gelatin (1 g.). During this addition, the mixture is stirred vigorously. There is then added water (180 ml.) containing sodium hydroxide (0.1 equivalent) and sodium borate decahydrate (10 g.). Emulsification is allowed to proceed for approximately 15–20 minutes during which time the temperature of the emulsion is maintained at approximately 45–50° C. The emulsion is then cooled to about 25° C. and coated onto sheets of paper which have previously been coated with a latex of butadiene-styrene copolymer to reduce the porosity thereof. After the emulsion has been coated on the paper, the paper is dried at a temperature between 50 and 60° C. The dried paper has a pleasant appearance and is almost completely smudge proof.

EXAMPLE 2

A transfer copy sheet is prepared by dissolving 1-[bis (p-dimethylaminophenyl)methyl]-benzotriazole (2 g.) in paraffin oil (50 g.), emulsifying this solution in a solution of water (150 ml.) and gelatin (30 g.), coating the emulsion on a sheet of paper and drying the paper. The dried paper has a rupturable solid film thereon, the film containing inclusions of minute oil droplets.

EXAMPLE 3

3-nitrophthalic acid (10 g.) is melted at about 220° C. and mixed with $TiO_2$ (20 g.) which has previously been heated to about 200° C. The resultant mixture is maintained at a temperature of about 220° C. for approximately 10 minutes. The mixture is then cooled whereby a solid, friable mass is obtained. This mass is ground to a fine powder and the power is dispersed in a binder solution comprising water (200 ml.) and Jaguar J2S1 (2 g.) which is derivative of guar gum. The dispersion of binder and $TiO_2$ particles having adsorbed thereon the 3-nitrophthalic acid is then coated onto the surface of a paper and dried at a temperature of from about 50 to 60° C. The dried paper has a pleasant appearance. When a transfer sheet prepared as described in Example 1 is superimposed on top of the adsorbent sheet and writing pressure is applied to the transfer sheet, colored markings are instantly formed on the adsorbent sheet. These markings are intense and stable towards exposure to direct sunlight, heat and high relative humidity.

EXAMPLE 4

The procedure of Example 3 is repeated except that the $TiO_2$ particles having adsorbed thereon the 3-nitrophthalic acid are dispersed in water (200 ml.) containing corn starch (2 g.) which has been cooked for 20 minutes instead of the water containing Jaguar J2S1. Equivalent results are obtained.

EXAMPLE 5

The process of Example 3 is repeated with the exception that the $TiO_2$ particles having adsorbed thereon the 3-nitrophthalic acid are dispersed in water (200 ml.) containing methylcellulose (6 g.) (4000 cp.) and $TiO_2$ (5 g.) instead of the water containing Jaguar J2S1. Equivalent results are obtained.

EXAMPLE 6

A copolymer of methyl vinyl ether and maleic anhydride (4 g.) (Gantrez AN 169) is dissolved with heating in water (100 ml.). To this solution there is slowly added over a period of 15 minutes $TiO_2$ (2 g.) and a solution of 3-nitrophthalic acid (2.5 g.) in acetone (15 ml.). This composition is mixed in a blender for 15 minutes. The mixture is then coated on the surface of paper and dried at a temperature between 50–60° C. The dried paper has a pleasant appearance. A transfer copy system is made by superimposing the transfer copy sheet described in Example 1 on the adsorbent sheet of this example. When pressure is exerted on the transfer copy sheet by means of a pencil, colored markings instantaneously appear in the corresponding areas of the adsorbent sheet. The colored markings are intense and stable towards exposure to sunlight, heat and high relative humidity.

EXAMPLE 7

Jaguar J2S1 (0.7 g.) is dissolved in water (100 ml.). To this solution, there are added zinc oxide (8 g.), titanium dioxide (3 g.), barium sulfate (3 g.), and glycolic acid (0.7 gm.-equivalent). The mixture is heated and stirred vigorously and is then coated onto paper. After drying, the paper has a good appearance. It may be used in association with a transfer copy sheet as described in Example 2. Pressure exerted on the transfer sheet gives an instantaneous, stable marking on the adsorbent sheet.

EXAMPLE 8

To chlorinated biphenyl oil (50 g.) is added 3-hydroxy-2-naphthoic acid (4 g.) and the mixture is heated to dissolve the acid. A solution of methyl cellulose (3 g.) and polyvinylpyrroidone (3 g.) in water (150 ml.) is added to the hot solution of acid in oil. The mixture is stirred vigorously for 15–20 minutes after which the emulsion is coated onto a paper which has previously been coated with a butadiene-styrene latex. The paper is then dried at about 50–60° C. The dried sheet is used as the adsorbent sheet in a pressure responsive copy system in association with the transfer copy sheet described in Example 1. Writing pressure exerted on the transfer sheet results instantaneously in a stable colored marking on the adsorbent sheet.

Although the invention has been described in considerable detail with particular reference to certain preferred embodiments thereof, variations and modifications can be effected within the spirit and scope of the invention as described hereinbefore, and as defined in the appended claims. Thus, any of the derivatives of bis(p-dialkylaminoaryl) methane and/or carboxylic acids previously described herein may be substituted in the process of the foregoing examples.

I claim:
1. A process for preparing a colored substance which comprises converting a color-reactant compound having the general formula

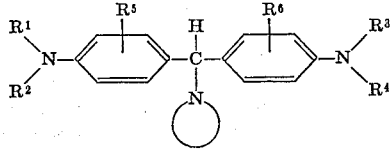

wherein
each $R^1$, $R^2$, $R^3$ and $R^4$ is a (lower)alkyl radical;
each $R^5$ and $R^6$ is a member selected from the group consisting of hydrogen, (lower)alkyl, (lower)alkoxy, fluorine, chlorine, bromine, di(lower)alkylamino, (lower)alkanoylamino and —SO$_2$NH$_2$;

represents a radical selected from the group consisting of heterocyclic radicals containing at least one double bond and saturated heterocyclic radicals which:
when said radical contains at least one double bond, is a member containing 5 or 6 ring members and 1 to 3 nitrogen atoms, the remaining ring atoms being carbon, said radical being selected from the group consisting of those which are free from substituents and those which contain 1 to 2 substituents selected from the group consisting of alkyl up to 18 carbon atoms, octadecenyl, cycloalkyl in which the ring contains 5 to 6 carbon atoms, (lower)alkyloxy, (lower) hydroxyalkyl, (lower)hydroxyalkoxy, phenyl(lower)alkyl, mononuclear hydrocarbon aryl, mononuclear hydrocarbon aroxy, benzo, fluorine, chlorine, bromine, nitro, di(lower)alkylamino, (lower)alkanoylamino and —SO$_2$NH$_2$; and
when said radical is saturated, is selected from the group consisting of pyrrolidino, piperidino, morpholino, thiomorpholino, hexamethylene imino, methylhexamethylene imino, heptamethylene imino, and piperazino, at least one of the piperazino nitrogen atoms forming the linking point to the methane carbon atom of a bis(p-dialkylaminoryl)-methane having the herein defined formula

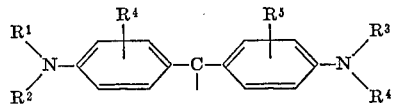

an substituted derivatives of pyrrolidino, piperidino, morpholino and piperazino in which the substituents are selected from the group consisting of alkyl up to 18 carbon atoms, octadecenyl, cycloalkyl and condensed cycloalkyl in which the rings contain 5 to 6 carbon atoms, (lower)alkyloxy, (lower)hydroxyalkyl, (lower)hydroxyalkoxy, phenyl(lower)alkyl, mononuclear hydrocarbon aryl, mononuclear hydrocarbon aroxy, fluorine, chlorine, bromine, nitro, di(lower)alkylamino, (lower)alkanoylamino, and —SO$_2$NH$_2$;
into a colored substance by contacting said compound with a carboxylic acid selected from the group consisting of (a) aromatic acids containing a carboxylic group attached to one of the carbon atoms of the aromatic ring and either a hydroxy group substituted on one of the carbon atoms of the aromatic nucleus ortho to the carboxylic group or a nitro group substituted on one of the carbon atoms of the aromatic nucleus meta to the carboxylic group and (b) aliphatic acids containing a hydroxy group substituted on the carbon atom which is adjacent to the carboxylic group.

2. A process according to claim 1 wherein said carboxylic acid is 3-nitrophthalic acid.
3. A process according to claim 1 wherein said carboxylic acid is 3-hydroxy-2-naphthoic acid.
4. In a pressure responsive transfer copy set comprising a transfer sheet superimposed on an adsorbent sheet, the transfer sheet having a coating on one surface thereof in contact with said adsorbent sheet, said coating comprising a color-reactant material which forms a colored marking when brought into contact with an electron acceptor, and a material normally insulating said color-reactant material in said coating to prevent contact with said adsorbent sheet but being rupturable upon the application of localized pressure on said transfer sheet whereby said color-reactant material is released and contacts said adsorbent sheet; said adsorbent sheet having a coating on one surface thereof in contact with said transfer sheet, said coating containing an electron acceptor;
the improvement wherein said color-reactant material on the transfer sheet comprises a compound having the general formula

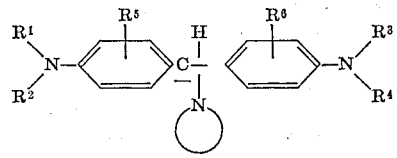

wherein each $R^1$, $R^2$, $R^3$ and $R^4$ is a (lower)alkyl radical;

each $R^5$ and $R^6$ is a member selected from the group consisting of hydrogen, (lower)alkyl, (lower)alkoxy, fluorine, chlorine, bromine, di(lower)alkylamino, (lower)alkanoylamino and —$SO_2NH_2$;

represents a radical selected from the group consisting of heterocyclic radicals containing at least one double bond and saturated heterocyclic radicals which:

when said radical contains at least one double bond, is a member containing 5 or 6 ring members and 1 to 3 nitrogen atoms, the remaining ring atoms being carbon, said radical being selected from the group consisting of those which are free from substituents and those which contain 1 to 2 substituents selected from the group consisting of alkyl up to 18 carbon atoms, octadecenyl, cycloalkyl in which the ring contains 5 to 6 carbon atoms, (lower) alkyloxy, (lower)hydroxyalkyl, phenyl(lower)alkyl, mononuclear hydrocarbon aryl, mononuclear hydrocarbon aroxy, benzo, fluorine, chlorine, bromine, nitro, di(lower)alkylamino, (lower)alkanoylamino and

—$SO_2NH_2$ and when said radical is saturated, is selected from the group consisting of pyrrolidino, piperidino, morpholino, thiomorpholino, hexamethylene imino, methylhexamethylene imino, heptamethylene imino, and piperazino, at least one of the piperazino nitrogen atoms forming the linking point to the methane carbon atom of a bis(p-dialkylamino-aryl)methane having the herein defined formula

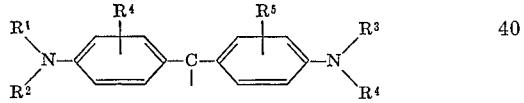

and substituted derivatives of pyrrolidino, piperidino, morpholino and piperazino in which the substituents are selected from the group consisting of alkyl up to 18 carbon atoms, octadecenyl, cycloalkyl and condensed cycloalkyl in which the rings contain 5 to 6 carbon atoms, (lower)alkyloxy, (lower)hydroxyalkyl, (lower)hydroxyalkoxy, phenyl(lower)alkyl, mononuclear hydrocarbon aryl, mononuclear hydrocarbon aroxy, fluorine, chlorine, bromine, nitro, di(lower)alkylamino, (lower alkanoylamino, and —$SO_2NH_2$;

and wherein said electron acceptor on said adsorbent sheet comprises a carboxylic acid selected from the group consisting of (a) aromatic acids containing a carboxylic group substituted on one of the carbon atoms of the aromatic rings and either a hydroxy group substituted on one of the carbon atoms of the aromatic nucleus ortho to the carboxylic group or a nitro group substituted on one of the carbon atoms of the aromatic nucleus meta to the carboxylic group and (b) aliphatic acids containing a hydroxy group substituted on the carbon atom which is adjacent to the carboxylic group.

5. A pressure responsive copy system as defined in claim 4 wherein said color-reactant material is dissolved in minute droplets of oil contained in a rupturable, solid film.

6. A pressure responsive copy system as defined in claim 4 wherein said carboxylic acid is dissolved in minute droplets of oil contained in microcapsules.

7. A pressure responsive copy system as defined in claim 4 wherein said carboxylic acid is adsorbed on an inorganic mineral pigment.

8. A pressure responsive copy system as defined in claim 7 wherein said inorganic mineral pigment is selected from the group consisting of titanium dioxide, zinc oxide, barium sulfate, calcium sulfate and mixtures thereof.

9. A pressure responsive copy system as defined in claim 4 wherein said transfer sheet and said adsorbent sheet are paper.

References Cited

UNITED STATES PATENTS

| 2,755,200 | 7/1956 | Balon et al. | 117—36.2 |
| 2,972,547 | 2/1961 | Tien | 117—36.2 |
| 2,981,733 | 4/1961 | Kranz | 117—36.2 |
| 2,981,738 | 4/1961 | Kranz | 117—36.2 |
| 2,983,756 | 5/1961 | Kranz | 117—36.2 |
| 3,020,170 | 2/1962 | Macaulay | 117—36.2 |
| 3,293,060 | 12/1966 | Harbort | 117—36.2 |

MURRAY KATZ, Primary Examiner

U.S. Cl. X.R.

8—77, 92; 117—150, 155; 260—247.2